(12) United States Patent
Huskic et al.

(10) Patent No.: US 12,365,338 B2
(45) Date of Patent: Jul. 22, 2025

(54) METHOD AND DEVICE FOR THE LONGITUDINAL CONTROL OF A VEHICLE

(71) Applicants: Mercedes-Benz Group AG, Stuttgart (DE); Robert Bosch GmbH, Stuttgart (DE)

(72) Inventors: Goran Huskic, Stuttgart (DE); Atta Oveisi, Fellbach (DE); Alexander Fürsich, Stuttgart (DE); Thomas Rothermel, Renningen (DE); Klaus-Peter Kuhn, Hochdorf (DE); Peter Boesch, Leonberg (DE); André Kempf, Stuttgart (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/714,119

(22) PCT Filed: Nov. 15, 2022

(86) PCT No.: PCT/EP2022/081896
§ 371 (c)(1),
(2) Date: May 29, 2024

(87) PCT Pub. No.: WO2023/099193
PCT Pub. Date: Jun. 8, 2023

(65) Prior Publication Data
US 2024/0416911 A1 Dec. 19, 2024

(30) Foreign Application Priority Data
Nov. 30, 2021 (DE) .................. 10 2021 213 486.6

(51) Int. Cl.
B60W 30/14 (2006.01)

(52) U.S. Cl.
CPC ....... *B60W 30/146* (2013.01); *B60W 2520/10* (2013.01); *B60W 2520/105* (2013.01);
(Continued)

(58) Field of Classification Search
CPC ............. B60W 30/143; B60W 30/146; B60W 2520/10; B60W 2520/105; B60W 2720/106
See application file for complete search history.

(56) References Cited

U.S. PATENT DOCUMENTS 6,233,515 B1    5/2001  Engelman et al.
2021/0078573 A1  3/2021  Kashiwamura
2023/0399013 A1* 12/2023 Kume ................. B60W 30/162

FOREIGN PATENT DOCUMENTS

CN    110770664 A    2/2020
CN    111873998 A    11/2020
(Continued)

OTHER PUBLICATIONS

European Patent Office, International Search Report in Application No. PCT/EP2022/081896, dated Mar. 7, 2023, 12 pages, Rijswijk, Netherlands.

*Primary Examiner* — Anshul Sood
(74) *Attorney, Agent, or Firm* — Marshall & Melhorn, LLC

(57) ABSTRACT

A method and device for longitudinal control of a vehicle as a function of a target trajectory, which specifies a series of target positions to be assumed by the vehicle over time. A controller actuating acceleration for trajectory control is determined based on an actual state of the vehicle. When the vehicle is following the target trajectory, a curvature of the target trajectory at a current position of the vehicle is determined from a local course of the target trajectory. Furthermore, when the vehicle is following the target trajectory, a longitudinal acceleration resulting from the target (Continued)

trajectory is determined as the current trajectory acceleration at the current position of the vehicle and the controller actuating acceleration is limited to a value that corresponds at most to a sum of the current trajectory acceleration and the acceleration offset. The vehicle is accelerated in accordance with the limited controller actuating acceleration.

6 Claims, 4 Drawing Sheets

(52) U.S. Cl.
CPC ..... *B60W 2552/30* (2020.02); *B60W 2710/18* (2013.01); *B60W 2720/106* (2013.01)

(56) References Cited

FOREIGN PATENT DOCUMENTS

| | | |
|---|---|---|
| CN | 113442949 A | 9/2021 |
| CN | 113525369 A | 10/2021 |
| DE | 102017114471 A1 | 3/2018 |
| DE | 102017010180 B3 | 4/2019 |
| DE | 102018210648 A1 | 1/2020 |
| DE | 102018125250 A1 | 4/2020 |
| EP | 1008482 A2 | 6/2000 |
| JP | 2003207519 A | 7/2003 |
| JP | 2023008220 A | 1/2023 |

\* cited by examiner

METHOD AND DEVICE FOR THE LONGITUDINAL CONTROL OF A VEHICLE

FIELD

The invention relates to a method for the longitudinal control of a vehicle.

The invention also relates to a device for the longitudinal control of a vehicle.

Background

DE 10 2017 010 180 B3 discloses a device and a method for controlling a longitudinal position of a vehicle by means of a longitudinal position controller which generates a longitudinal acceleration control signal for a subordinate acceleration control unit from a longitudinal dynamic pre-control setpoint variable and longitudinal dynamic control error variables. A current control reference point corresponding to a current point in time and a preceding control reference point corresponding to a predeterminable look-ahead point in time are determined as control-relevant points in time. For each of the control reference points, current or predicted actual/target deviations of a longitudinal position, a driving speed and an acceleration are determined and used as the basis for forming the longitudinal dynamic control error variables. Furthermore, target acceleration values are determined for each of the control reference points and used as the basis for forming the longitudinal dynamic pre-control target value. The longitudinal dynamic pre-control setpoint is formed by summing the acceleration setpoints determined for the control reference points in a weighted manner.

Furthermore, DE 10 2017 114 471 A1 discloses a vehicle control device which is configured in such a way that it causes a vehicle to drive autonomously. The vehicle control device comprises:
  a longitudinal position collation unit configured to recognize a longitudinal position corresponding to a position of the vehicle in an extending direction of a path on which the vehicle travels, based on image information from a camera and position information of an orientation point on a map;
  a longitudinal position estimation unit configured to estimate the longitudinal position based on a result of detection by an internal sensor that detects a vehicle state and a result of recognition by the longitudinal position collation unit;
  an error estimation unit configured to estimate an error in the longitudinal position estimated by the longitudinal position estimation unit based on a detection accuracy by the internal sensor;
  a radius obtaining unit configured to obtain a curve radius of a curved road ahead of the vehicle using the estimated longitudinal position and the map information;
  a cornering speed calculating unit configured to calculate a cornering speed for autonomously driving the vehicle in the lane on the curved road with the obtained cornering radius based on the obtained cornering radius and the estimated error in the longitudinal position;
  a speed control unit configured to decelerate the vehicle in a case in which the vehicle speed is higher than or equal to the cornering speed and the cornering speed is higher than or equal to a preset reference speed, so that the vehicle speed becomes the cornering speed at the time of entering the curved road ahead of the vehicle, and which is configured such that, in a case in which the vehicle speed is higher than or equal to the cornering speed and the cornering speed is lower than the reference speed, it decelerates the vehicle so that the current speed is maintained or the vehicle speed becomes the reference speed at the time of entering the curved road ahead of the vehicle; and
  a request unit configured to, in a case in which the vehicle speed is higher than or equal to the cornering speed and the cornering speed is lower than the reference speed, perform a manual operation request to change control of the vehicle to a manual operation by a driver,
  wherein the cornering speed calculating unit is configured to make the cornering speed low in a case in which the cornering radius is small compared to a case in which the cornering radius is large, and is configured to make the cornering speed low in a case in which the error in the longitudinal position is large compared to a case in which the error in the longitudinal position is small.

DE 10 2018 210 648 A1 describes a longitudinal driver assistance system in a motor vehicle with a detection system for the predictive detection of several events, each of which leads to a change in a target speed based on a target speed currently reached. Furthermore, the driver assistance system comprises a functional unit in which a function for event selection can be activated when a plurality of events occur comparatively close together in a predefined observation period. The event selection function can be used to determine a modified target speed for longitudinal guidance control in such a way that, in a first step, only those events are selected that lead to a reduced target speed based on an actual speed.

The object of the invention is to provide a novel method and a novel device for the longitudinal control of a vehicle.

According to the invention, the problem is solved by a method having the features and by a device having the features specified in the claims described herein

Summary

In the method according to the invention for longitudinal control of a vehicle as a function of a target trajectory, which specifies a series of target positions to be assumed by the vehicle over time, a controller actuating acceleration for trajectory control is determined based on an actual state of the vehicle, by means of which the vehicle is to be accelerated in accordance with specifications of the target trajectory. When the vehicle is following the target trajectory, a curvature of the target trajectory at a current position of the vehicle is determined from a local course of the target trajectory, whereby an acceleration offset that decreases with increasing curvature is determined on the basis of the curvature. Furthermore, when the vehicle is following the target trajectory, a longitudinal acceleration resulting from the target trajectory is determined as the current trajectory acceleration at the current position of the vehicle. The controller actuating acceleration is limited to a value that corresponds at most to a sum of the current trajectory acceleration and the acceleration offset, and the vehicle is accelerated in accordance with the limited controller actuating acceleration.

Trajectory control of an automated, in particular highly automated or autonomously driving vehicle, is a fundamental prerequisite for realizing the automated driving function. This involves deciding which actions the vehicle should perform in the future based on data from an environment detection system. The result of this decision is a trajectory which, for example, maps the position of the vehicle on a road over time and serves as a movement reference in a known vehicle environment. The trajectory control is intended to follow the trajectory as accurately as possible. If, for any reason, a major longitudinal position control error has built up, a trajectory specification at the target position does not correspond to a trajectory specification at an actual position on the road at which the vehicle is currently located. This means that a "target time" continues to run. There is a risk that the vehicle is in a tight bend, for example, and accelerates automatically because a temporal reference point, i.e. the target position, is already further ahead in the trajectory, for example on a straight line following the bend.

In this method, a discrepancy between the local reference point, i.e. the actual position of the vehicle, and the temporal reference point, i.e. the target position of the vehicle in the trajectory, is taken into account in the longitudinal control of the vehicle. The method is used to limit a target acceleration specification if it is too high at the actual position. With such a curvature-dependent acceleration limitation at the actual position, dangerous situations resulting from excessive acceleration can be prevented, for example excessive acceleration in a tight bend.

In other words, the method enables safe trajectory control with the aim of reaching a planned position at an associated time, whereby, if necessary, the acceleration at the actual position is limited by a curvature-dependent acceleration limit below the value of the acceleration specification at the target position.

In one possible embodiment of the method, the actual state of the vehicle is formed from at least an actual speed of the vehicle, an actual acceleration of the vehicle and/or an actual position of the vehicle. The actual state can be easily depicted using these variables, so that the controller actuating acceleration can be reliably determined.

In a further possible embodiment of the method, an actual position or a next target position from the series of target positions is used as the current position of the vehicle. This enables the current position of the vehicle to be determined easily and with sufficient accuracy to determine the curvature.

In a further possible embodiment of the method, the longitudinal acceleration resulting from the target trajectory is determined from a temporal change in distances between successive target positions of the target trajectory. This makes it easy to determine the current trajectory acceleration.

In a further possible embodiment of the method, the target trajectory is fed to a trajectory controller, by means of which the vehicle is to be accelerated according to the specifications of the target trajectory using the controller actuating acceleration. The limited controller actuating acceleration is fed to an acceleration control unit which is subordinate to the trajectory controller and which controls and/or regulates a real acceleration of the vehicle.

In a further possible embodiment of the method, if a predetermined difference between the predetermined controller actuating acceleration and the limited controller actuating acceleration is exceeded, the target trajectory is recalculated. In this way, a deviation of the target trajectory from an actual trajectory and, as a result, a deviation of the controller actuating acceleration from the corrected controller actuating acceleration can be minimized.

The device according to the invention for longitudinal control of a vehicle as a function of a target trajectory, which specifies a series of target positions to be assumed by the vehicle over time, comprises a trajectory controller, which uses a target trajectory supplied to it to determine a controller actuating acceleration for trajectory control based on an actual state of the vehicle, by means of which the vehicle is to be accelerated in accordance with specifications of the target trajectory. The device also comprises a pre-processing unit, which determines a curvature of the target trajectory at a current position of the vehicle from a local course of the target trajectory when the vehicle is following the target trajectory. Furthermore, the pre-processing unit uses the curvature to determine an acceleration offset that decreases with increasing curvature and, when the vehicle is following the target trajectory, a longitudinal acceleration resulting from the target trajectory is determined as the current trajectory acceleration at the current position of the vehicle. In addition, the device comprises a limiting unit which limits the controller actuating acceleration to a value which corresponds at most to a sum of the current trajectory acceleration and the acceleration offset, as well as an acceleration control unit which is subordinate to the trajectory controller and which accelerates the vehicle in accordance with the limited controller actuating acceleration.

By means of the device, a discrepancy between the local reference point, i.e. the actual position of the vehicle, and the temporal reference point, i.e. the target position of the vehicle in the trajectory, can be taken into account in the longitudinal control of the vehicle.

The device limits a target acceleration specification if it is too high at the actual position. With such a curvature-dependent acceleration limitation at the actual position, dangerous situations resulting from excessive acceleration can be prevented, for example excessive acceleration in a tight bend.

In other words, the device enables safe trajectory control with the aim of reaching a planned position at an associated time, whereby, if necessary, the acceleration at the actual position is limited by a curvature-dependent acceleration limit below the value of the acceleration specification at the target position.

In one possible embodiment of the device, the acceleration control unit is a vehicle braking system. This can be used to set the limited controller control acceleration simply and reliably.

In a further possible embodiment of the device, it comprises a control error monitoring unit which recalculates the target trajectory if a predefined difference between the predefined controller actuating acceleration and the limited controller actuating acceleration is exceeded. In this way, a deviation of the target trajectory from an actual trajectory and, as a result, a deviation of the controller actuating acceleration from the corrected controller actuating acceleration can be minimized.

DESCRIPTION OF THE FIGURES

Examples of embodiments of the invention are explained in more detail below with reference to drawings.

DETAILED DESCRIPTION

Corresponding parts are marked with the same reference signs in all figures.

Figure 1:
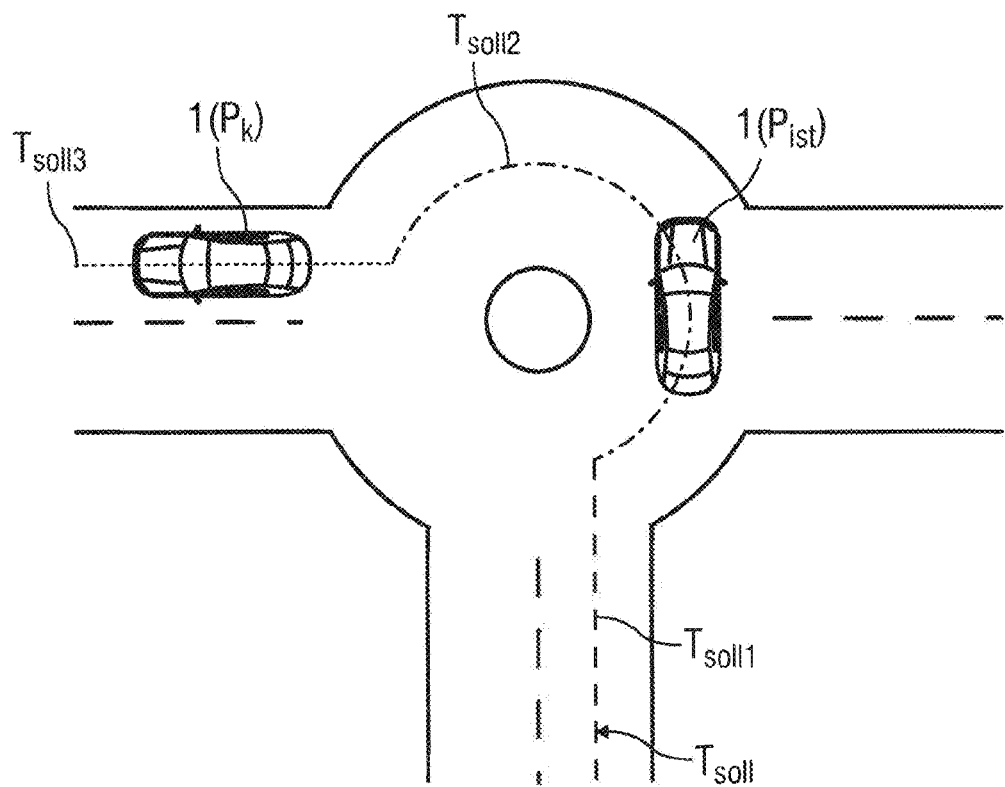
FIG. 1 is a schematic top view of a traffic situation with a vehicle in an actual position and a target position.
Figure 2:
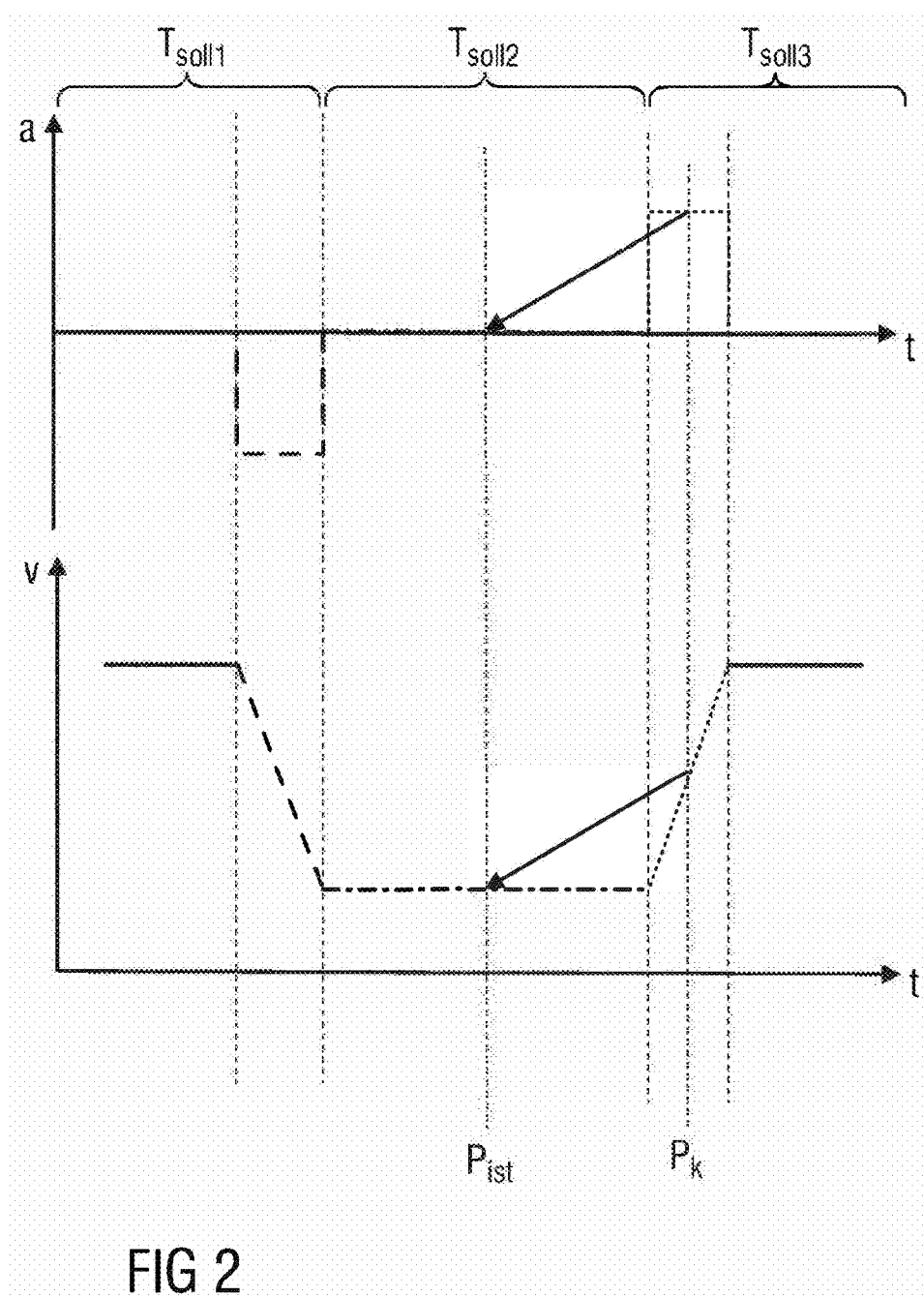
FIG. 2 shows schematic diagrams of the acceleration and speed of a vehicle over time.

FIG. 1 is a top view of a traffic situation with a vehicle 1 in an actual position $P_{ist}$ and a target position $P_k$ as well as a target trajectory $T_{soll}$ with several trajectory sections $T_{soll1}$ to $T_{soll3}$. FIG. 2 shows curves of an acceleration a and a speed v of the vehicle 1 according to FIG. 1 as a function of the time t.

The vehicle 1 is designed for automated, in particular highly automated or autonomous driving. Trajectory control is a fundamental prerequisite for the realization of such an automated driving function.

Figure 3:
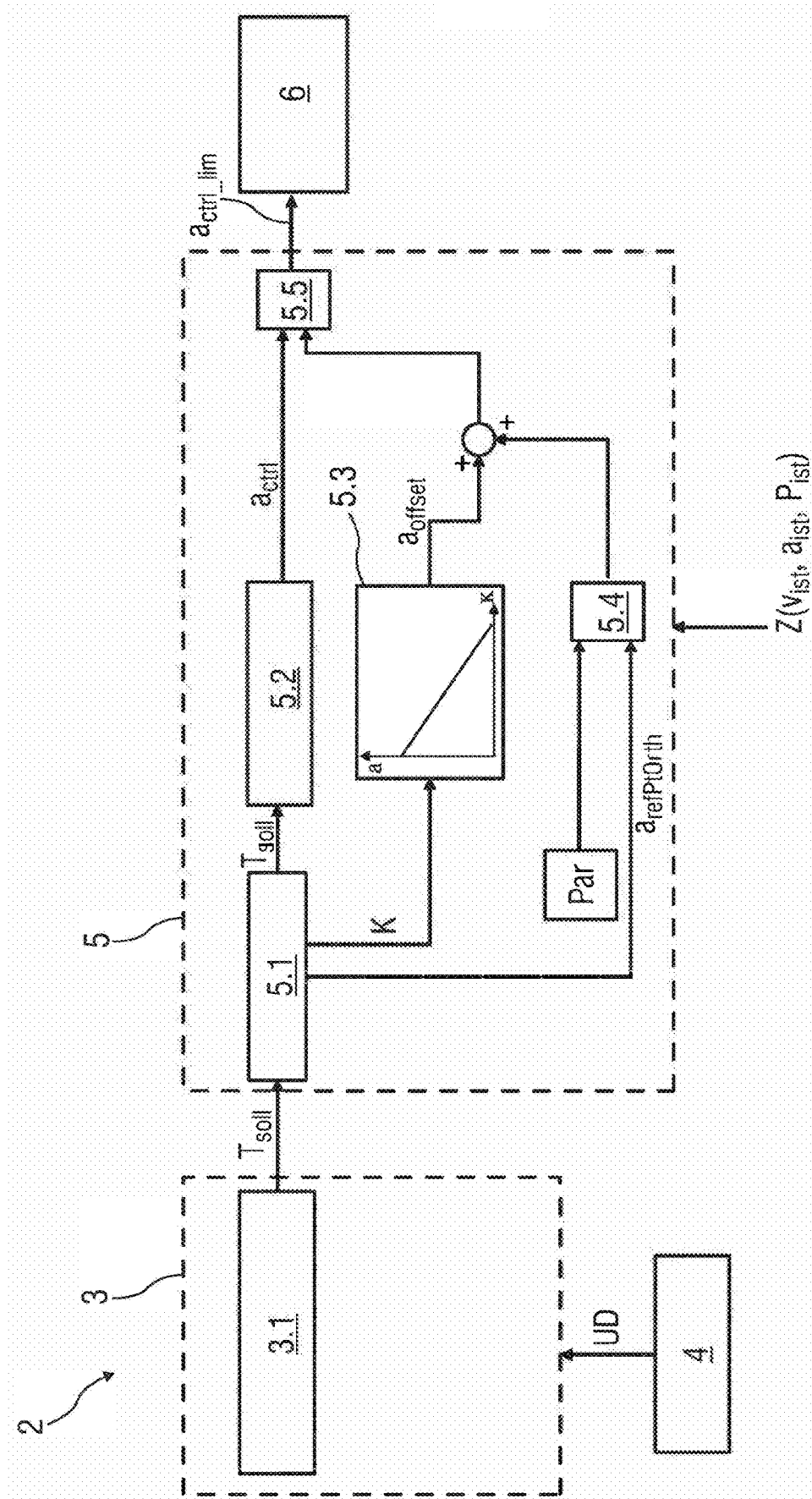
FIG. 3 is a schematic block diagram of a device for longitudinal control of a vehicle.

In this trajectory control, a decision is made on which actions the vehicle 1 should perform in the future based on data UD from an environment detection system shown in more detail in FIG. 3. The result of this decision is the target trajectory $T_{soll}$, which, for example, represents a position of the vehicle 1 on a roadway over the time t and serves as a movement reference in a known vehicle environment. The trajectory control is intended to follow the trajectory as accurately as possible. If, for any reason, a major longitudinal position control error has built up, a trajectory specification at the target position $P_k$ does not correspond to a trajectory specification at the actual position $P_{ist}$ on the road at which the vehicle 1 is currently located. This means that a "target time" continues to run.

Using a traffic circle as an example, the illustration shows that the actual position $P_{ist}$ of the automated vehicle 1 is behind the target position $P_k$. The actual position $P_{ist}$ is located in the traffic circle, while the target position $P_k$ is already outside the traffic circle after leaving it.

As FIG. 2 shows, according to the speed profile assigned to the target trajectory $T_{soll}$ and the acceleration profile, it is intended that the vehicle 1 should travel at a low constant speed v within the traffic circle on the trajectory section $T_{soll2}$ and accelerate more strongly on the trajectory section $T_{soll3}$ after the traffic circle until a higher speed v is reached. The acceleration profile intended for the trajectory section $T_{soll3}$ is not suitable for use with a road geometry in the trajectory section $T_{soll2}$.

However, since, as shown in FIG. 1, the temporal reference point, i.e. the target position $P_k$ in the trajectory section $T_{soll3}$, and the local reference point, i.e. the actual position $P_{ist}$ in the trajectory section $T_{soll2}$, are far apart, there is a risk that the vehicle 1 is located within the traffic circle on the trajectory section $T_{soll2}$ and accelerates automatically because the temporal reference point is already further ahead, in this case on a straight line following the traffic circle in the trajectory section $T_{soll3}$.

In this situation, a typical trajectory controller would attempt to compensate for a longitudinal position error and vehicle 1 would accelerate faster in the traffic circle. Depending on how large a curvature K is in the route, such a situation is generally undesirable and potentially dangerous.

Such errors can also occur if a so-called control error monitoring module is present in the system for the automated operation of the vehicle 1, which reschedules the target trajectory $T_{soll}$ if a control error becomes larger. This is the case, for example, if the control error is relatively large but lies below a defined threshold for redefining the target trajectory $T_{soll}$.

If, however, the actual position $P_{ist}$ is still in the trajectory section $T_{soll1}$ instead of the trajectory section $T_{soll2}$, and the vehicle 1 is still decelerating, this does not result in a safety-relevant problem. In this case, the control error would increase even more, but without undesirable acceleration a.

FIG. 3 shows a block diagram of a device 2 for longitudinal control of a vehicle 1.

The device 2 comprises a first computing unit 3 with a trajectory planning module 3.1, which plans the target trajectory $T_{soll}$ on the basis of data UD recorded by means of an environment detection sensor 4.

In order to solve the problem illustrated in FIGS. 1 and 2, where a deviation of the actual position $P_{ist}$ from the target position $P_k$ results in unadjusted accelerations a of the vehicle 1 in automated driving mode, the target trajectory $T_{soll}$ is fed to a further computing unit 5 with a pre-processing module 5.1, a trajectory controller 5.2, a characteristic curve 5.3, a maximum value detector 5.4 and a limiting unit 5.5.

When the vehicle 1 is following the target trajectory $T_{soll}$, the pre-processing module 5.1 derives a curvature K of the target trajectory $T_{soll}$ at a current position of the vehicle 1 from a local course of the target trajectory $T_{soll}$.

Using the characteristic curve 5.3, which represents the acceleration a of the vehicle 1 as a function of the curvature K, the pre-processing module 5.1 determines an acceleration offset $a_{offset}$ that decreases with increasing curvature K as a function of the curvature K and, in particular, using predicted future information. This acceleration offset $a_{offset}$ can also be formed as a function of a friction value of a road surface and forms a permissible acceleration deviation.

Furthermore, when the vehicle 1 is following the target trajectory $T_{soll}$, the pre-processing module 5.1 determines a longitudinal acceleration resulting from the target trajectory $T_{soll}$ as the current trajectory acceleration $a_{refPtOrth}$ at a current position of the vehicle 1, for example the actual position $P_{ist}$, and feeds it to the limiting unit 5.5. This trajectory acceleration $a_{refPtOrth}$ forms a reference acceleration at a trajectory point closest to the current position of the vehicle 1.

Figure 4:
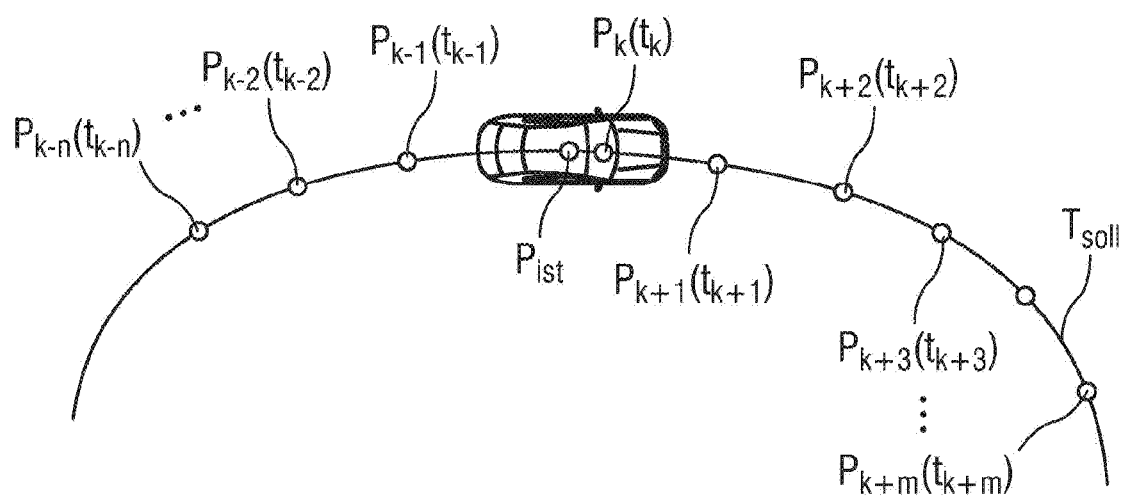
FIG. 4 is a schematic view of the course of a target trajectory of a vehicle.

In contrast to the actual position $P_{ist}$ of the vehicle 1, a next target position $P_k$ from a series of target positions $P_{k-n}$ to $P_{k+m}$ of the target trajectory $T_{soll}$ shown in more detail in FIG. 4 can also be used as the current position of the vehicle 1.

The longitudinal acceleration resulting from the target trajectory $T_{soll}$ can be determined from a temporal change in distances between successive target positions $P_{k-n}$ to $P_{k+m}$ of the target trajectory $T_{soll}$ shown in more detail in FIG. 4.

The acceleration offset $a_{offset}$ and the trajectory acceleration $a_{refPtOrth}$ are added together, whereby a sum formed is also fed to the limiting unit 5.5.

Furthermore, the trajectory controller 5.2 uses the target trajectory $T_{soll}$ supplied to it to determine a controller actuating acceleration $a_{ctrl}$ for trajectory control based on an actual state Z of the vehicle 1, by means of which the vehicle 1 is to be accelerated in accordance with specifications of the target trajectory $T_{soll}$. The actual state Z of the vehicle 1 is characterized, for example, by an actual speed $v_{ist}$, an actual acceleration $a_{ist}$ and the actual position $P_{ist}$ of the vehicle 1.

By means of the limiting unit 5.5, the minimum of the sum of the acceleration offset $a_{offset}$ and the trajectory acceleration $a_{refPtOrth}$ and the actuating acceleration $a_{ctrl}$ is used to calculate a limited controller actuating acceleration $a_{ctrl\_lim}$ in accordance with $$a_{ctrl\_lim} = \min(a_{ctrl}, \max(\text{Par}, a_{refPtOrth}) + a_{offset}) \quad (1)$$

determined.

Only trajectory accelerations $a_{refPtOrth}$ that are greater than a positive parameter Par are taken into account, as otherwise the vehicle 1 would come to a standstill in a deceleration phase. In this case, a negative trajectory acceleration $a_{refPtOrth}$ is always smaller than a positive controller actuating acceleration $a_{ctrl}$ in a subsequent acceleration phase.

The limited controller actuating acceleration $a_{ctrl\_lim}$ is fed to an acceleration control unit 6, which is subordinate to the trajectory controller 5.2 and accelerates the vehicle 1 in accordance with the limited controller actuating acceleration $a_{ctrl\_lim}$. The acceleration control unit 6 is, for example, a vehicle braking system. In this way, the control system output is never greater than the local trajectory acceleration $a_{refPtOrth}$, offset upwards by a permissible curvature-dependent deviation.

It is therefore possible that the vehicle 1 would not accelerate undesirably strongly at the actual position $P_{ist}$ in the situation shown in FIG. 1. On a straight stretch of road, on the other hand, vehicle 1 can accelerate sufficiently strongly and compensate for a control error.

FIG. 4 shows a course of a possible target trajectory $T_{soll}$ of a vehicle 1. The target trajectory $T_{soll}$ specifies a series of target positions $P_{k-n}$ to $P_{k+m}$ to be assumed by the vehicle 1 over the time t at respective points in time $t_{k-n}$ to $t_{k+m}$.

LIST OF REFERENCE NUMBERS 1 vehicle
2 device
3 computing unit
3.1 trajectory planning module
4 environment detection sensor system
5 computing unit
5.1 processing module
5.2 trajectory controller
5.3 characteristic curve
5.4 maximum value detector
5.5' limiting unit
6 acceleration control unit
a acceleration
$a_{ctrl}$ controller actuating acceleration
$a_{ctrl\_lim}$ limited controller actuating acceleration
$a_{ist}$ actual acceleration
$a_{offset}$ acceleration offset
$a_{refPtOrth}$ trajectory acceleration
K curvature
Par parameter
$P_{ist}$ actual position
$P_{k-n}$ to $P_{k+m}$ target position
t time
$t_{k-n}$ to $t_{k+m}$ point in time
$T_{soll}$ target trajectory
$T_{soll1}$ to $T_{soll3}$ trajectory section
UD data
v speed
$v_{ist}$ actual speed
Z actual state

The invention claimed is:

1. A method for longitudinal control of a vehicle as a function of a target trajectory which specifies a series of target positions to be assumed by the vehicle over time, wherein based on an actual state of the vehicle, a controller actuating acceleration for trajectory control, by means of which the vehicle is to be accelerated in accordance with specifications of the target trajectory, is determined, when the vehicle is following the target trajectory, a curvature of the target trajectory at a current position of the vehicle is determined from a local course of the target trajectory, an acceleration offset that decreases with increasing curvature is determined on the basis of the curvature, when the vehicle is following the target trajectory, a longitudinal acceleration resulting from the target trajectory is determined as a current trajectory acceleration at the current position of the vehicle, the controller actuating acceleration is limited to a value that corresponds at most to a sum of the current trajectory acceleration and the acceleration offset, and the vehicle is accelerated in accordance with the limited controller actuating acceleration.

2. The method according to claim 1, wherein the actual state of the vehicle is formed at least from an actual speed, an actual acceleration and/or an actual position of the vehicle.

3. The method according to claim 1, wherein data from an actual position or data from a next target position from the series of target positions represents the current position of the vehicle when calculating a future state of the vehicle.

4. The method according to claim 1, wherein the longitudinal acceleration resulting from the target trajectory is determined from a temporal change of distances between successive target positions of the target trajectory.

5. The method according to claim 1, wherein the target trajectory is fed to a trajectory controller, by means of which the vehicle is to be accelerated in accordance with the specifications of the target trajectory using the controller actuating acceleration, and the limited controller actuating acceleration is fed to an acceleration control unit which is subordinate to the trajectory controller and which controls and/or regulates a real acceleration of the vehicle.

6. The method according to claim 1, wherein if a predetermined difference between the determined controller actuating acceleration, by means of which the vehicle is to be accelerated in accordance with specifications of the target trajectory, and the limited controller actuating acceleration is exceeded, a recalculation of the target trajectory is carried out.

* * * * *